United States Patent [19]

Alvarez et al.

[11] 4,397,019
[45] Aug. 2, 1983

[54] TDMA INTERTRANSPONDER COMMUNICATION

[75] Inventors: Joseph A. Alvarez, Damascus; Patrick H. Higgins, Ijamsville, both of Md.

[73] Assignee: IBM Corporation, Armonk, N.Y.

[21] Appl. No.: 263,334

[22] Filed: May 13, 1981

Related U.S. Application Data

[63] Continuation of Ser. No. 47,951, Jun. 8, 1979, which is a continuation of Ser. No. 842,016, Oct. 11, 1977, abandoned.

[51] Int. Cl.$^3$ ............................. H04J 3/16; H04J 3/02
[52] U.S. Cl. ...................................... 370/104; 370/50; 370/79; 455/13
[58] Field of Search .................... 370/104, 50, 95, 97, 370/75, 79; 455/12, 13

[56] References Cited

U.S. PATENT DOCUMENTS

| | | | |
|---|---|---|---|
| 3,761,813 | 9/1973 | Perrin | 370/50 |
| 3,838,221 | 9/1974 | Schmidt et al. | 370/104 |
| 4,017,684 | 4/1977 | Kurihara | 370/104 |
| 4,115,661 | 9/1978 | Schmidt | 370/104 |
| 4,135,059 | 1/1979 | Schmidt | 370/104 |

Primary Examiner—Douglas W. Olms
Attorney, Agent, or Firm—Robert Lieber

[57] ABSTRACT

Groups of stations operate in TDMA mode relative to associated frequency-separated transponder segments of a satellite repeater. Stations at radio signaling modes in all groups key to a common frame timing reference. The TDMA frame is partitioned repetitively into IN GROUP and CROSS GROUP intervals, each susceptible of containing multiple demand assignable burst time slots. Each node may transmit TDMA bursts (of time compressed and time multiplexed information signals) in assigned slots in either interval (or both). Such bursts are carried only on the transponder radio frequency associated with the respective group. Station receivers are adaptive to switch local oscillator frequencies in synchronism with transitions between IN GROUP and CROSS GROUP periods, and thereby adaptive to receive signals from stations in both groups. A frame reference signal carried on the transponder frequency associated with one of the groups is receivable by stations in the same group during IN GROUP mode reception and by stations in the other group during CROSS GROUP mode reception. Consequently stations in both groups may key to that reference signal. The transition (crossover time) from IN GROUP mode to CROSS GROUP mode can be varied in time position to efficiently accommodate demand within and between groups.

2 Claims, 21 Drawing Figures

FIG. 11 GRP ASSIGNMENT BURST (G-AB)

FIG. 12 TRANSMIT REFERENCE BURST (XRB)

FIG. 13 "CROSS GRP" ASSIGNMT'S BURST (CG-AB)

FIG. 14 EXAMPLES OF GRP TRANSPONDER SPECTRA

| FRAME 0 | SATELLITE RECEIVES | SATELLITE SENDS |
|---|---|---|
| IN GRP | ft 1 | fr 1 |
| IN GRP | ft 2 | fr 2 |
| CROSS GRP | ft 1 | fr 2 |
| CROSS GRP | ft 2 | fr 1 |

FIG. 20

TDMA INTERTRANSPONDER COMMUNICATION

This is a continuation of application Ser. No. 47,951 filed June 8, 1979 which was a continuation of Ser. No. 842,016 filed Oct. 11, 1977, now abandoned.

CROSS REFERENCES TO RELATED PATENTS

U.S. Pat. No. 4,009,344 granted Feb. 22, 1977 to D. C. Flemming, which is assigned to the assignee of the subject invention, describes a system employing TDMA and demand assignment operations which are considered relevant to the present invention.

BACKGROUND OF THE INVENTION

1. Field of the Invention

This invention relates to time division multiple access (TDMA) communication systems; and particularly to TDMA systems in which multiple radio stations communicate through an earth satellite repeater by transmitting time-synchronized bursts of radio energy relative to said repeater and receiving a time multiplex composite of bursts containing corresponding modulation information from said repeater.

2. Prior Art

Systems of radio communication using techniques of TDMA operation and TDMA/DA operation (DA referring to demand assignment) are well known.

In TDMA operation multiple transceiver stations associated with radio signaling nodes transmit bursts of time concentrated information signals on a shared carrier frequency spectrum and receive the same information signals after repetition by the satellite on a shifted carrier frequency spectrum. Each station is assigned particular time slots in a continuum of recurrent frames for transmission of its bursts and for reception of its own bursts and bursts of other stations. The bursts interleave at the satellite in close time formation without overlapping.

In DA operation lengths of assigned slots may be varied in accordance with the relative distribution of demand at the signaling nodes.

Various systems have been proposed for enabling stations operating in TDMA mode relative to different transponder frequency spectra to intercommunicate. Such proposed systems have been rejected for various reasons. Systems based upon time domain switching relative to transmission frequency spectra have been rejected as overly expensive and inefficient because of the magnitudes of transmission power which must be handled. Systems based upon simultaneous transmission on plural frequency bands at each node have been rejected as inefficient and overly complex.

The present invention concerns a system for providing intertransponder communication in TDMA mode which is efficient, inexpensive to implement relative to conventional unitransponder systems, and relatively simple to construct and operate.

SUMMARY OF THE INVENTION

A principal object of this invention is to provide a system for TDMA communication between radio transponders (across time-divided transponder frequency bands) in which transmission frequency bands do not have to be switched or under-utilized.

A related general objective is to provide a system for intertransponder communication between groups of stations operating in TDMA mode relative to separated carrier frequency bands (transponders) which is efficient, practical, economical and simple.

These and other objectives and advantages of this invention are achieved presently by partitioning the TDMA frame repetitively into IN GROUP (intratransponder) and CROSS GROUP (intertransponder) periods relative to plural groups of stations. Stations in any group which are adapted for operation in CROSS GROUP (intertransponder) mode are operative to switch reception frequencies at time points of transition between IN GROUP and CROSS GROUP periods.

Stations in each group transmit on a single carrier radio frequency band exclusively allocated to the group. Station receiving equipment adapted for operation in CROSS GROUP mode switches local oscillation frequencies at predetermined time points of transition between IN GROUP and CROSS GROUP periods. This enables adapted stations to receive information signals from stations in both groups. The crossover time $T_{I/X}$ from IN GROUP mode to CROSS GROUP mode is susceptible of being varied to balance overall utilization of the satellite repeater by all stations.

Stations in each group synchronize their transmission and reception burst apertures to time bases derived from a common frame timing reference. This reference is communicated from a primary reference station at one radio transmission node of the system via the transponder frequency associated with one of the groups. The frame reference is carried in a time slot situated effectively between the end of each CROSS GROUP period and the beginning of the next IN GROUP period. Those stations which utilize the same transponder as the primary reference station receive the frame reference in time continuity with their IN GROUP mode of reception. Stations in other groups receive the frame reference in time continuity with the end of their CROSS GROUP mode of reception.

The foregoing and other features, aspects, objectives and advantages of the subject invention may be more fully appreciated and understood by considering the following detailed description.

DETAILED DESCRIPTION
INTRODUCTION

Figure 1:
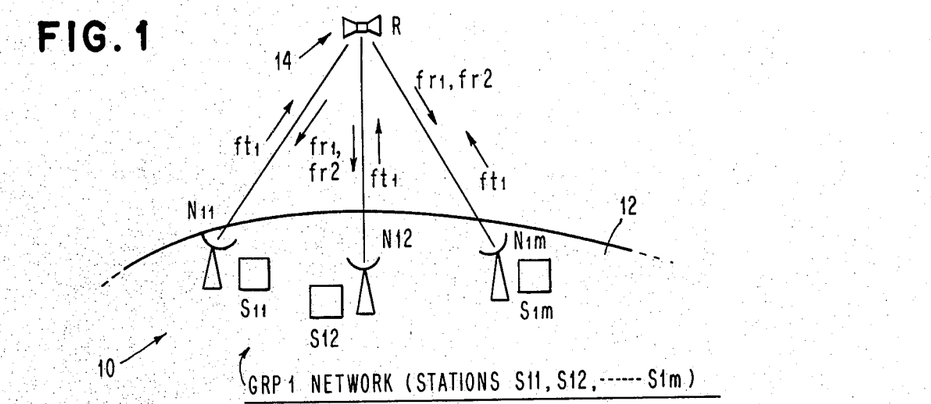
FIGS. 1 and 2 illustrate two TDMA networks formed by discrete groups of stations operating relative to separate time-divided frequency bands (transponder segments) of a satellite radio repeater.
Figure 2:
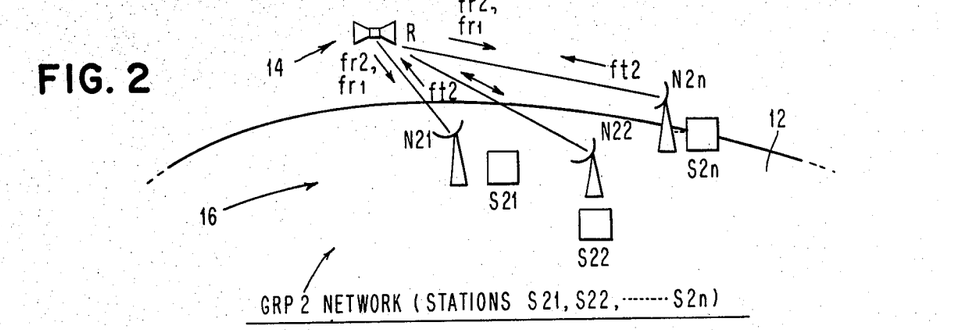

FIG. 1 suggests a first group of radio stations 10 which are located at geographically separated sites on the surface of the earth 12 and intercommunicate in TDMA mode through geostationary satellite repeater 14 (also designated R) using an associated transmission carrier frequency ft1. FIG. 2 suggests a second group of radio stations 16, which may be geographically remote from stations of the first group and intercommunicate in TDMA mode through the same satellite repeater 14 using transmission carrier frequency ft2 separate from ft1. This invention concerns a method of linking stations in both groups.

The radio antennas in groups 1 and 2 are referred to as radiation access nodes N and identified by discrete 2-digit numerical suffixes; N1X for group 1 and N2Y for group 2, where X ranges from 1 through m and Y from 1 through n. In the specific embodiment to be described m and n can each be as large as 100. Station equipment associated with each radiation access node N is designated by the symbol S and a corresponding two digit suffix. Such equipment performs radio transceiving operations, information processing operations, through-connection operations and signal conversion functions.

In ordinary TDMA operations stations in both groups transmit bursts of time concentrated information signals in each TDMA frame. The information signals are carried as modulation on respective group carrier frequencies ft1 and ft2. The bursts of individual stations are timed relative to the bursts of a reference/master station in each group so as to reach the satellite repeater in closely spaced time formation without overlapping. The repeater operates as a transponder to shift the carrier frequency spectra (ft1 to fr1 and ft2 to fr2) and retransmits the information in a time multiplexed mosaic (or composite) of bursts. This mosaic is received by each station of the associated group and from it each station extracts control information and traffic information pre-scheduled for connective routing through ports of that station.

Figure 3:
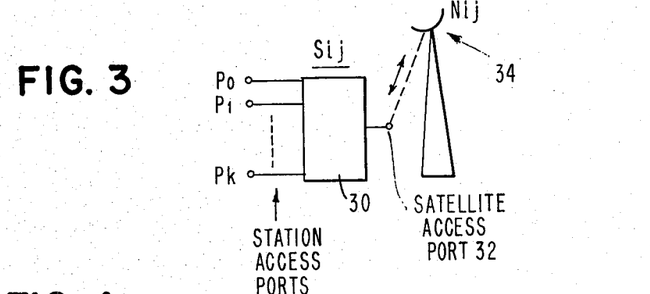
FIGS. 3 and 4 schematically illustrate the organization of a typical nodal access station suitable for adaptation to operate in a system in accordance with the subject invention.

FIG. 3 illustrates the general organization of access equipment in a typical station. The station ports are designated by an ordered series of symbols P0, P1 . . . Pk where k is an integer within a predetermined range. The station equipment 30 exchanges information signals with the ports and provides time compression/decompression (buffer storage) and time division multiplex/demultiplex handling of information signals relative to transceiver access port 32 which is linked to the associated access node antenna 34.

Figure 4:
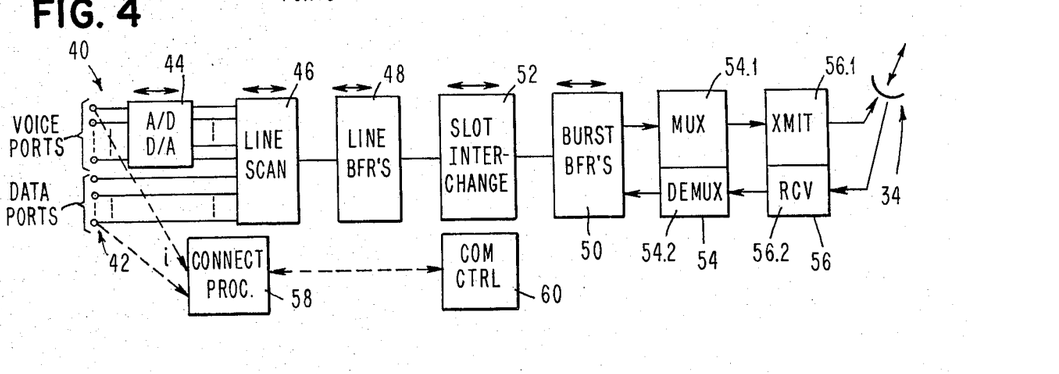

Referring to FIG. 4 the ports of such a station may be assigned to carry telephone (voice) traffic signals and data traffic signals. Voice ports are indicated at 40 and data ports at 42. Typically the voice ports exchange analog "voice" signals with time shared station circuits 44 which convert such signals between analog and digital (e.g., delta modulation) forms. "Traffic" signals entering the station equipment at voice telephone ports are converted from analog to digital (delta mod) form and traffic signals passing from the station equipment to voice ports are converted from digital to analog form. Line scanning circuits 46 interface with conversion circuits 44 and data ports 42 for exchanging traffic signals bit-sequentially between multiple ports 40, 42 and line buffer storage arrays 48.

Buffer arrays 48 exchange bytes (groups of bits) between byte storage spaces associated with specific ports and block (channel) storage spaces in burst buffer storage arrays 50 through slot interchange switching array circuits 52. Spaces in arrays 50 are associated with time division channels in the TDMA burst communication path to the satellite. Circuits 52 operate as a time position switching exchange relative to the ports and satellite TDMA channels.

Burst buffer arrays 50 exchange multi-byte blocks (channels) of burst traffic with burst multiplex/demultiplex process circuits 54. Circuits 54 exchange burst information signals with modulation/demodulation circuits of transceiver equipment 56 which links to the satellite access node 34.

Connection request sensing circuits 58 interface with ports 40, 42 for sensing connection request signals (e.g., "off-hook" signals at ports 40), initiating setup of connections and terminating (releasing) connections. Common control facilities 60 (e.g., a programmed general purpose data processing system) interface with connection sensing circuits 58 and multiplex/demultiplex circuits 54 for exchanging information (including connection request, connection acknowledgment and connection release information) with other stations via access node 34 and the satellite repeater. Facilities 60 also connect with slot interchange circuits 52 for setting up connections in the respective station equipment. Facilities 60 also operate as described below to control station synchronization for TDMA operation and to provide interstation communication for slot and crossover time assignment processes by which satellite burst time is allocated to the stations.

The organization and operation of station equipment associated with a similar single-group TDMA/DA system is described in the above-referenced U.S. Pat. No. 4,009,344 to Flemming. To the extent that such description is relevant to the system and demand assignment process described herein it is incorporated herein by reference.

The information channels exchanged between buffer arrays 50 and satellite access node 34 are time concentrated into TDMA bursts which occupy small fractions of a TDMA time frame. The multiplexing section 54.1 of circuits 54 composes the outgoing channels of information into burst form. The transmitting section 56.1 of transceiver equipment 56 modulates the outgoing channels on the carrier ft1 or ft2 of the group associated with this station for transmission to the satellite repeater. Typically the modulation may be in the form of quadrature phase shift keying (QPSK). The satellite shifts the carrier bands of group 1 signals to fr1 and group 2 signals to fr2, and retransmits composite interleaved bursts on each frequency.

Retransmitted bursts are received at radiation nodes 34, demodulated in receiving sections 56.2 of station transceivers 56 and demultiplexed in section 54.2 of station equipment 54. Section 54.2 in association with common control system 60 selects from among all of the channels of information in the received composite only those channels which are scheduled for utilization by or connection through the respective station (e.g., on the basis of connection tables maintained by system 60 and destination intelligence included in the received information). In each station selected channels which represent port traffic are passed to burst buffers 50 and distributed to ports 40, 42 (via switch 52, buffers 48, scanner 46 and circuits 44). The selected information channels which represent station control information are forwarded to system 60 and used for station synchronization, connection (including telephone line ringing) and release of connections. Other common control time assignment functions performed at particular reference (assignment) stations in each group will be considered and described below.

INTER-GROUP CONNECTION

Figure 5:
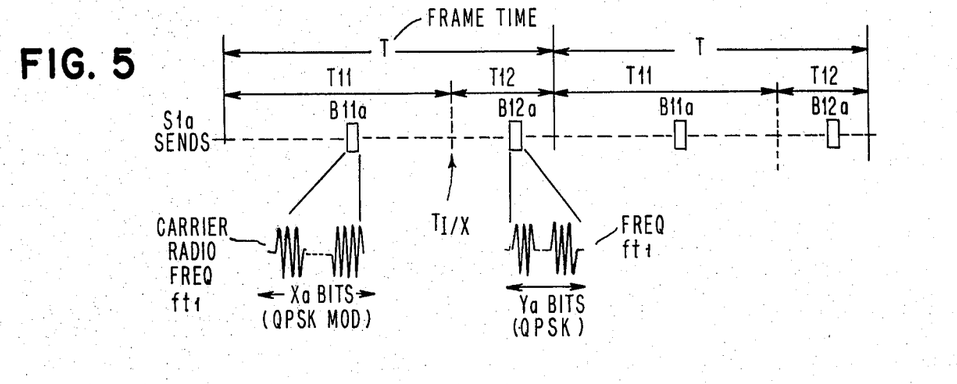
FIGS. 5 through 8 are schematic signal diagrams for explaining the method of operation of the subject invention.

Interconnection between stations of the first group (FIG. 1) and of the second group (FIG. 2) is accomplished in accordance with the present invention as follows. Referring to FIGS. 5 and 8, both groups use TDMA frame intervals T of equal duration and predetermined phase. Each frame is partitioned into IN GROUP and CROSS GROUP periods (sub-intervals) relative to each group. IN GROUP periods associated with group 1 stations (FIG. 1) are designated T11 (FIGS. 5 and 7) and IN GROUP periods associated with stations in group 2 (FIG. 2) are designated T22 (see FIGS. 6 and 8). CROSS GROUP periods associated with stations in group 1 are designated T12 (see FIGS. 5 and 7) and CROSS GROUP periods associated with stations in group 2 are designated T21 (see FIGS. 6 and 8). The crossover time point $T_{I/X}$ between T11 and T12 (FIG. 5) coincides with crossover time point $T_{I/X}$ between T22 and T21 (FIG. 6).

Figure 6:
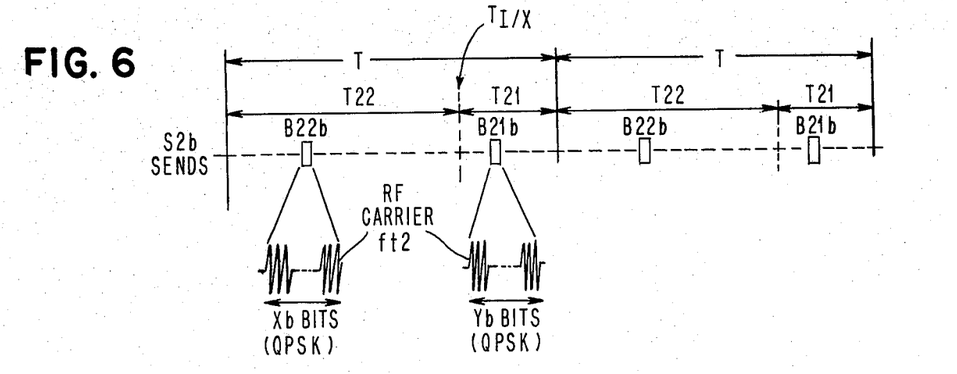

FIGS. 5 and 6 characterize transmission of bursts B from any access node N1a in the first group and any access node N2b in the second group. Bursts from station S1a (and node N1a) in the first group are designated B11a when such bursts occur in IN GROUP time T11 and B12a when coincident with CROSS GROUP time T12 (see FIG. 5). Bursts from station S2b (and node N2b) in the second group are designated B22b in T22 and B21b in T21. All bursts from N1a and all other first group nodes are carried on group carrier frequency ft1, and all bursts from N2b and the other second group nodes are carried on group carrier frequency ft2.

Figure 7:
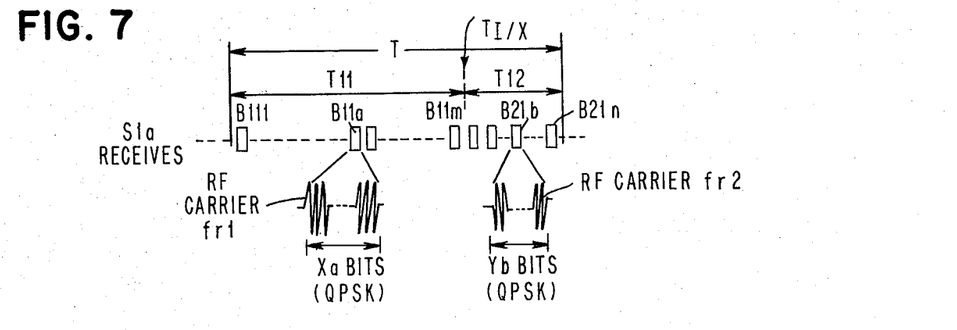
Figure 8:
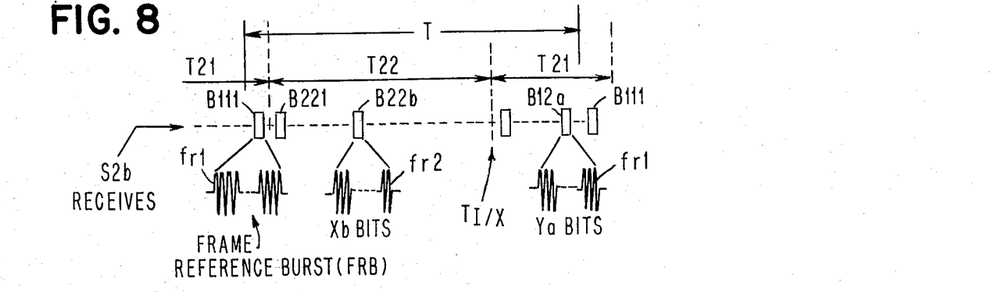

FIGS. 7 and 8 characterize the form of signals received at typical stations such as S1a and S2b in each group. During IN GROUP time T11, each station in the first group, such as station S1a, receives an identical composite sequence of multiple bursts B111, ..., B11a, ..., B11m (FIG. 7) modulated on carrier frequency fr1 which is associated in a transponder pairing with ft1. B111 is a frame reference burst. Coincidentally during IN GROUP time T22 stations such as S2b receive bursts B111, B221 ..., B22b, ..., etc. (FIG. 8), where B111 is carried on fr1 and the other bursts are carried on fr2 which is associated with ft2.

Consequently in T11 stations in the first group receive only bursts B11x originated at nodes in the first group while coincidentally in T22 stations in the second group receive the frame reference burst B111 (from a reference station in the first group) and bursts B22x from stations in the second group.

In CROSS GROUP time T12 stations in the first group such as S1a receive burst sequences B211, B212, ...B21x (FIG. 7) from stations in the second group, while coincidentally in T21 stations in the second group receive burst sequences ...B12x ... (FIG. 8) from stations in the first group.

Consequently these stations intercommunicate by receiving bursts originated from stations in the same group during the associated IN GROUP time (T11 or T22) and from stations in the other group during the associated CROSS GROUP time (T12 or T21).

FRAME FORMAT

A TDMA frame format which sustains IN GROUP and CROSS GROUP communication as described above (on separate transponder frequencies) is shown in FIGS. 9 through 13. Frames (FR) are fifteen milliseconds in duration. Groups of twenty consecutive frames comprise a superframe (SF) of 300 milliseconds duration. The superframe is the unit of signaling time for exchange of demand information. The exchange process will be described later with reference to FIG. 21.

Figure 9:
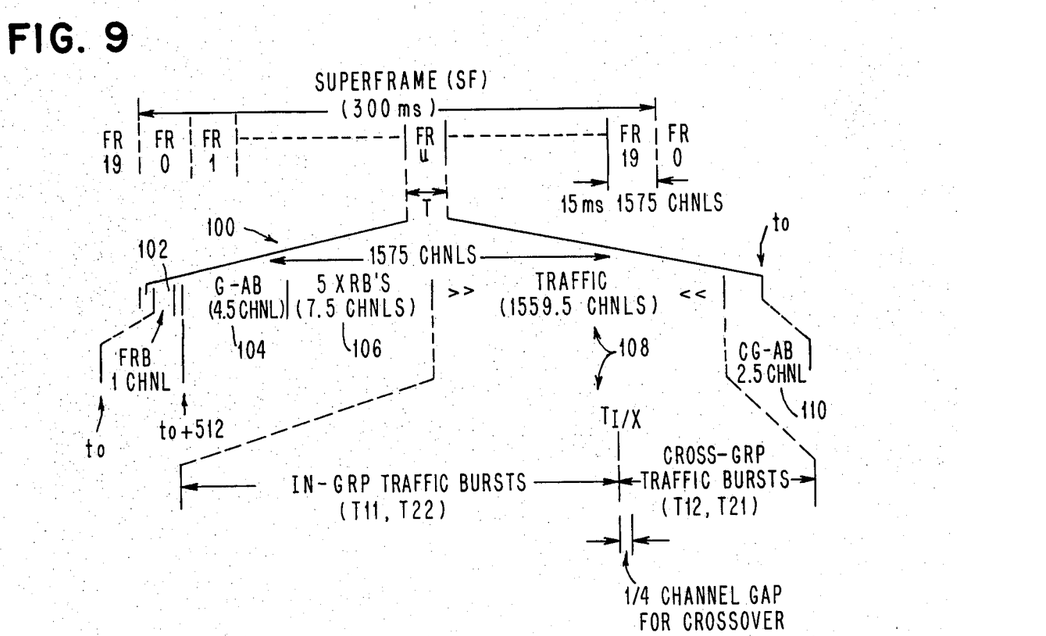
FIGS. 9 through 13 illustrate diagrammatically the frame formats for burst signaling in a system operating in accordance with the subject invention.

Each frame consists of 1575 channel slots each channel slot comprising 512 bit slots. Station bursts have various lengths usually encompassing at least one-half of a channel. This frame structure is designed to sustain bit transmission rates in excess of $53 \times 10^6$ bits per second. The form of a typical frame FR(u) is suggested at 100 (FIG. 9). The time point at which the frame begins is designated t0. The first channel slot after t0 is allocated for communication of a frame reference burst 102 (FRB). This burst is transmitted on ft1 by one predetermined station of the first group (FIG. 1) which is designated the primary reference station. The FRB burst is received (on fr1) by stations in both groups and utilized as a keying reference for synchronizing the burst transmissions of all stations relative to the satellite repeater.

The stations in the first group (group 1) receive the FRB (frame reference burst) in time continuity with the beginning of their IN GROUP reception mode (see T11, FIG. 7). Stations in the second group (group 2) receive the FRB in time continuity with the end of their CROSS GROUP mode of reception (see T21, FIG. 8). The form of the FRB will be discussed later.

The next four and a half channels of frame time are allocated for a group assignment burst (G-AB) 104. In this slot one group assignment burst G-AB1 is sent relative to group 1 stations on frequency ft1 and another group assignment burst G-AB2 is sent relative to group 2 stations on carrier frequency ft2. G-AB1 is transmitted preferably by the primary reference station which transmits the FRB and occupies the entire slot 104. G-AB2 is transmitted by a predetermined "assignment station" in group 2 (also called the secondary reference station) and also occupies the entire slot 104. The secondary reference station may be any station in group 2. The form of the bursts G-AB will be discussed later.

The next seven and a half channels of frame time (shown at 106, FIG. 9) are allocated for transmission reference bursts (XRB's). There are five XRB slots each 1.5 channels wide on each transponder (ft1, ft2). Each XRB is allottable to a different station. In successive frames of the superframe the XRB slots may be allotted to different sub-groups of five stations in each group so that each station of a group (of up to 100 stations) has at least one XRB slot available to it per super-frame. The form of the XRB burst will be discussed later.

The next 1559.5 channels of the frame, shown at 108 in FIG. 9, are available for demand assignable allocation to multiple stations for sustaining exchanges of traffic between ports of separate stations and of station control information between station control centers 60 (FIG. 4).

The burst slots allocated to group 1 stations are carried on frequency ft1. Those allocated to group 2 stations are carried on frequency ft2. Exchanges of station control information in the intervals 108 can be used for setting up and releasing connections relative to station ports, and for varying the relative timing of the IN GROUP periods (T11 and T22) and CROSS GROUP periods (T12, T21).

$T_{I/X}$ denotes the time of transition within interval 108 (also termed the crossover time) between IN GROUP and CROSS GROUP periods. Traffic bursts preceding $T_{I/X}$, termed IN GROUP traffic bursts, are transmitted only on ft1 by stations in group 1 and only on ft2 by stations in group 2; and are receivable only by stations in the respective groups on fr1 and fr2 respectively. Traffic bursts following after $T_{I/X}$, termed CROSS GROUP traffic bursts, are transmitted only on ft1 by stations in group 1 and only on ft2 by stations in group 2; and are receivable by stations in the opposite groups (see FIGS. 7 and 8).

The last two and a half channels of each frame shown at 110 in FIG. 9 are allocated for CROSS GROUP assignment bursts "CG-AB" which correspond to bursts G-AB in intervals 104. The burst CG-AB1 corresponding to G-AB1 is sent by the reference station of group 1 on ft1 in T12. Hence it is received by the stations in group 2. The burst CG-AB2 corresponding to G-AB2 is sent by the assignment (secondary reference) station of group 2 on ft2 in T21. Hence it is received by the stations in group 1. Consequently the bursts CG-AB enable the individual stations of each group to determine the time of arrival of CROSS GROUP traffic and establish reception apertures for CROSS GROUP traffic.

Figure 10:
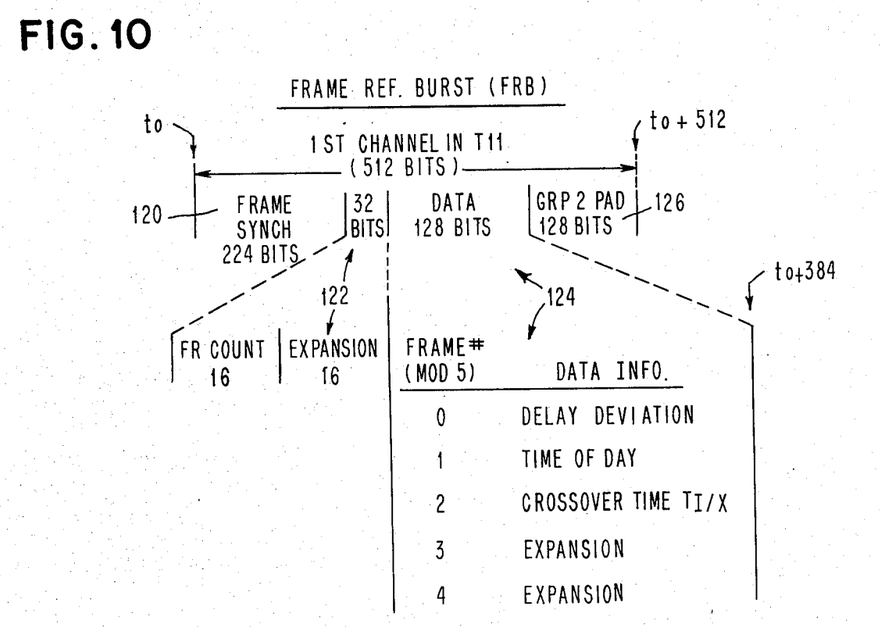

The format of the frame reference burst FRB is shown in FIG. 10. This burst includes a preamble bit sequence 120 followed by a frame identity bit sequence 122 (which may also be used to identify the primary node source if the source is variable). This is followed by data and "pad" sequences 124 and 126. The preamble 120 is 224 bits long and is used by each receiving station to establish bit synchronism for reception of the FRB information. The frame identity sequence of 32 bits is used to distinguish the frame position within the superframe. The data sequence of 128 bits contains information for synchronizing burst transmissions of stations in both groups and will be explained further below. The pad sequence of 128 bits serves as a filler which enables stations of group 1 to maintain bit synchronism while stations of group 2 switch their reception frequencies from fr1 to fr2 as explained later.

The data sequence 124 contains different information in successive frames of the superframe. In frames FR0, FR5, FR10 and FR15 of the superframe the data 124 contains delay deviation (range difference information) which characterizes the deviation of the signal propagation delay between the reference station and the satellite from a predetermined nominal delay value. In frames FR1, FR6, FR11 and FR16 the data 124 comprises time of day information. In frames FR2, FR7, FR12 and FR17 the data 124 contains crossover time information which designates the time position of $T_{I/X}$ relative to t0. In all other frames the slot 124 contains filler bits which are not used for information communication in the presently described embodiment but are available for future expansion of the system to accommodate more reference information.

Figure 11:
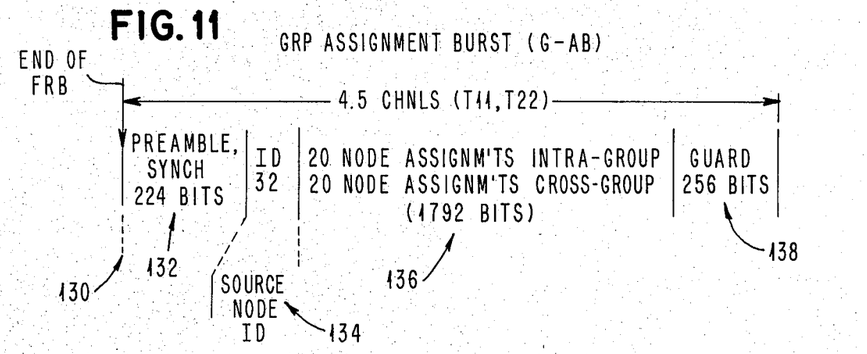

The group assignment burst G-AB is shown in FIG. 11. The beginning of this burst at 130 coincides with the end of the FRB burst. The burst comprises a preamble sequence 132 (224 bits), an identity sequence 134 (32 bits), an assignment data sequence 136 (1792 bits) and a guard space 138 (256 bit slots). The preamble is used by the receiving stations for bit synchronization. The identity field is used to distinguish the node which originates this burst (the group 1 primary reference station or group 2 secondary reference station). The assignment data 136 comprises up to twenty node assignments for IN GROUP communication and up to twenty node assignments for CROSS GROUP communication which are discussed below. The guard space 138 is a quiescent interval (of no signaling) which is used as a guard space relative to the beginning of the transmit reference burst slots.

The assignment data 136 indicates to up to twenty specific stations their burst assignment times relative to t0 for transmitting their bursts. The IN GROUP assignments in G-AB1 indicate to group 1 stations their respective burst transmission time assignments in time periods T11 (FIGS. 5, 7). The IN GROUP assignments in G-AB1 are also used by group 1 stations to develop reception apertures for selecting traffic information in time portions of T11 which are scheduled for reception at the respective nodes. The CROSS GROUP assignments in G-AB1 indicate to the same stations in group 1 their transmission time assignments in T12 (FIGS. 5, 7). The IN GROUP assignments in G-AB2 indicate to stations in group 2 their transmission assignments and enable these stations to establish their reception apertures in T22 (FIGS. 6, 8) and the CROSS GROUP assignments indicate to the same stations their transmission assignments in T21.

Figure 12:
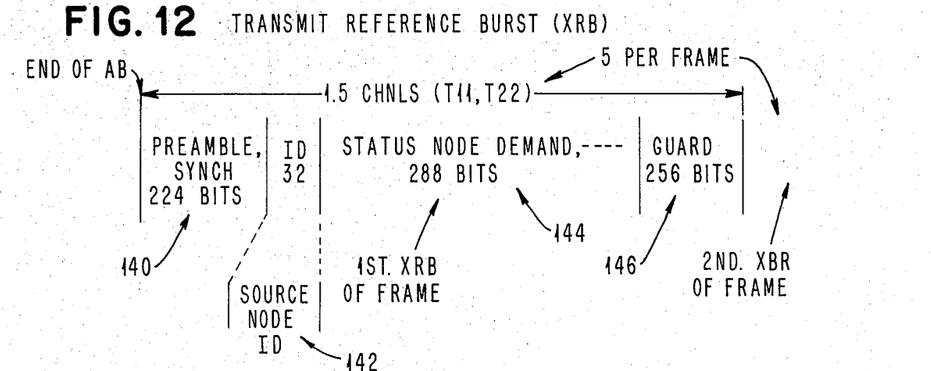

The form of each transmit reference burst XRB is indicated in FIG. 12. Each XRB (there are five XRB's per frame) comprises a preamble sequence 140 (224 bits), an identity sequence 142 (32 bits), a data sequence 144 (288 bits) and a guard space 146 (256 bit slots). The guard space is void of signals. The five XRB slots in a frame are allocatable to five different stations and are used by the respective stations to acquire synchronism for burst transmission and to signal status and demand requirements relative to the other nodes in the same and other groups. The identity sequence 142 identifies the node at which each XRB originates. The data sequence 144 contains the status and demand information.

Figure 13:
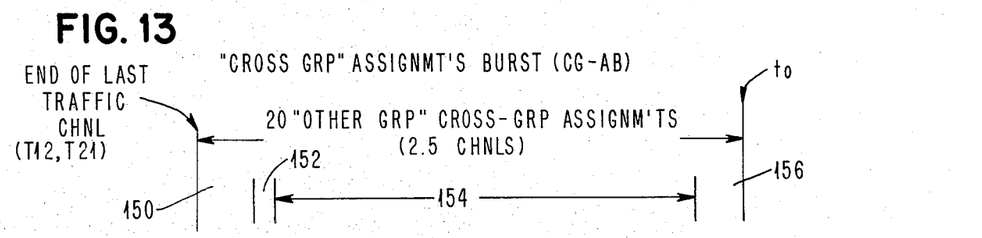

FIG. 13 illustrates the form of the CROSS GROUP assignment bursts CG-AB transmitted by the assignment (primary reference) station in group 1 and the assignment (secondary reference) station in group 2. Since these bursts are sent in coincidence during the CROSS GROUP intervals T12 and T21 they are received by the stations in the opposite group. The bursts CG-AB1 sent by the reference station in group 1 are received by the stations in group 2. The bursts CG-AB2 sent by the assignment station in group 2 are received by the stations in group 1. These bursts contain the CROSS GROUP assignment information of the corresponding bursts G-AB and are utilized by the stations receiving such bursts for developing reception apertures for selecting traffic information in T12 and T21 which is scheduled for reception at the respective nodes. Each such burst is 2.5 channels wide and comprises a preamble sequence 150 (224 bits), an identity sequence 152 (32 bits), assignment data 154 (896 bits) and a quiescent guard space 156 (128 bit slots); a total of two and a half channels (1280 bit slots). The assignment information corresponds identically to the IN GROUP assignment information contained in the corresponding G-AB burst. However since the bursts CG-AB are received during CROSS GROUP times T12 and T21 the CROSS GROUP assignment information enables the receiving stations to establish selective reception apertures for selective handling of inter-group traffic.

GROUP TRANSPONDER SPECTRA

Figure 14:
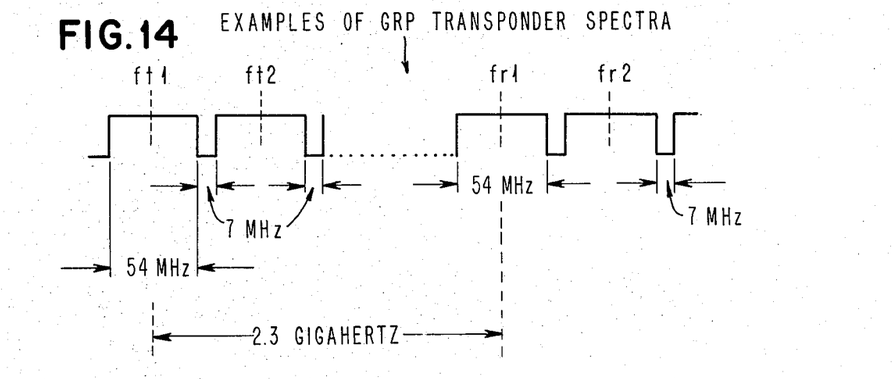
FIG. 14 illustrates in diagrammatic form transponder frequency spectra suitable for practicing the subject invention.

FIG. 14 illustrates the spectral distribution of the satellite transponder facilities allocatable to the two groups. This is obviously non-limitative and is illustrated only for the purpose of indicating the minimal required separation and bandwidth of such spectra. The transmission carrier frequency bands associated with ft1 and ft2 are 54 megahertz wide and are separated by a guard band of at least 7 megahertz as shown. The bands for reception associated with fr1 and fr2 are also 54 megahertz wide and separated by guard bands of 7 megahertz. The bands for transmission and reception may be separated by 2.3 gigahertz.

STATION RECEPTION

Figure 15:
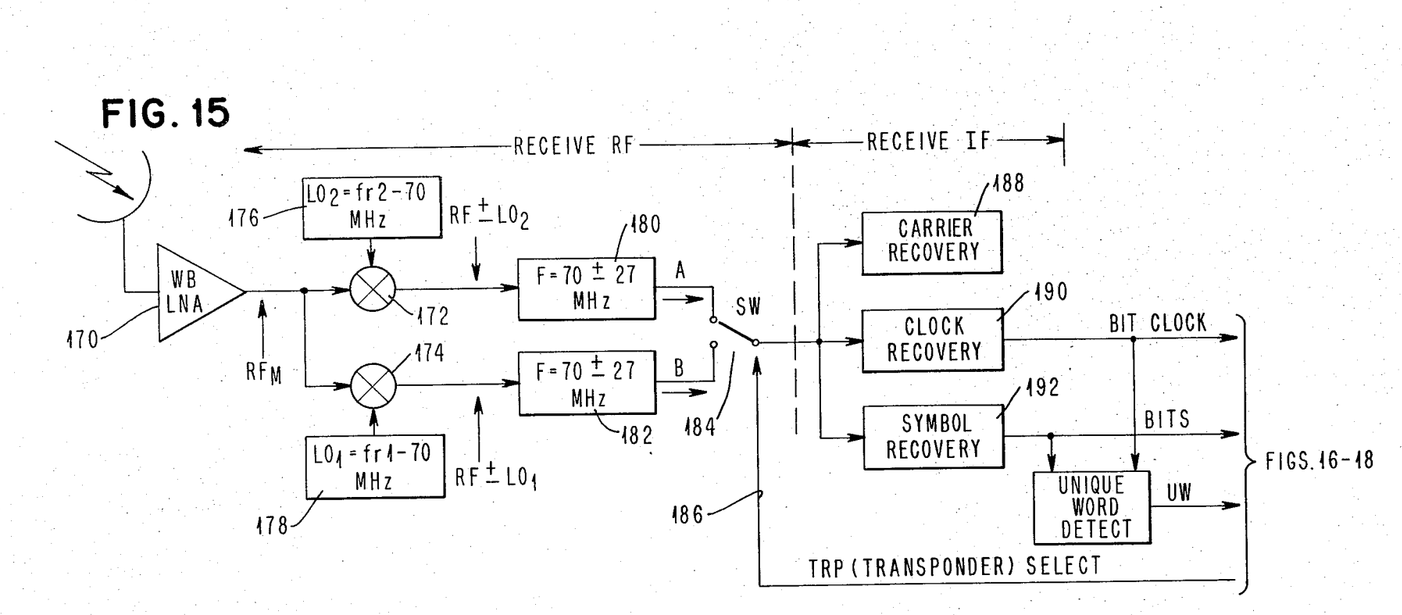
FIGS. 15, 16 and 18 schematically illustrate the logic of station reception for operation in accordance with the subject invention.

FIG. 15 illustrates the receiving equipment of a station schematically. The incoming signals are passed through wide band rf amplifier 170 to mixing circuits 172 and 174. Mixers 172 and 174 are respectively coupled to sources of local oscillation 176 and 178. Mixers 172 and 174 feed their respective outputs to narrow band filters 180 and 182. Outputs of circuits 180 and 182, which correspond to the modulation carried on fr2 and fr1 respectively (i.e., corresponding to the signals sent by group 2 and group 1 stations respectively), pass to signal taps A and B. Switch 184 (SW) alternates in position between taps A and B in each frame, and thereby alternately recovers IN GROUP and CROSS GROUP signals. The alternation actions of the switch 184 are controlled by line 186 labelled TRP SELECT. This action occurs in a time pattern which is dependent on the group association of the station. The signals passed through switch 184 are applied to carrier recovery circuits 188, clock recovery circuits 190 and symbol (bit) recovery circuits 192. The carrier recovery and clock recovery circuits operate to recover bit synchronization (bit clock). The symbol recovery circuits 192 operate to recover the bit information contained in the transmitted signals.

Unique word detection circuits 194 coupled to the outputs of the clock and bit recovery circuits detect unique words contained within the preambles of the various bursts. The same unique word may be used in the frame reference bursts FRB, the group assignment bursts (G-AB, CG-AB), the transmit reference bursts and the traffic bursts. The form of the unique word is considered non-relevant to the present invention. Furthermore, the utilization of unique words in TDMA communication bursts is well known in the art.

Figure 16:
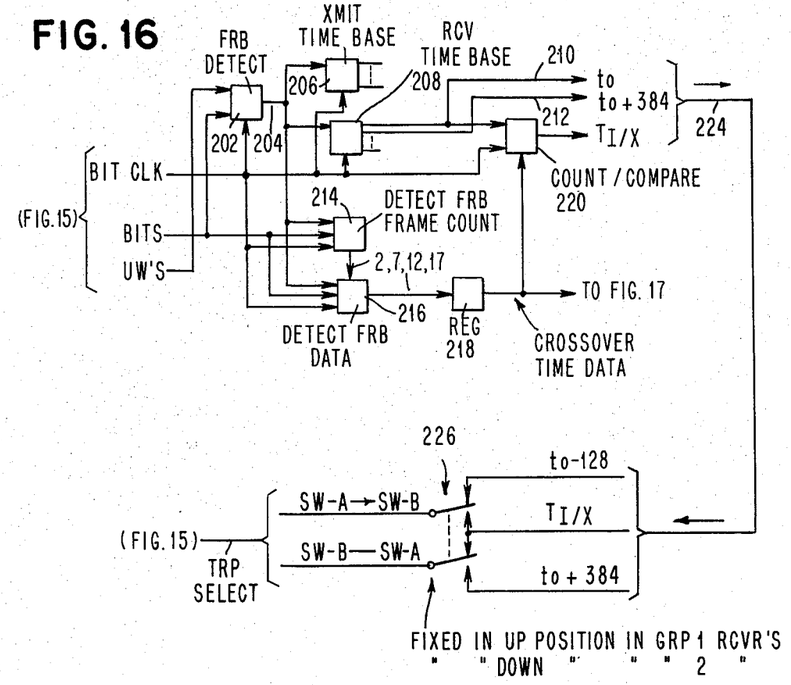

FIG. 16 illustrates the recovery of information for operation of the switch 184 (FIG. 15). The bit clock, bit symbol and unique word outputs of FIG. 15 are applied to FRB detection circuit 202 which responds to the unique word of the FRB to produce an enabling signal at its output 204. This signal enables time base circuits 206 and 208 to respectively generate time bases for burst transmission and reception. The reception time base generates time signals at 210 and 212 corresponding to the reception times of t0 and t0+384. Circuits 214 operate to distinguish the FRB's in frames 2, 5, 12 and 17 of each superframe. These FRB's contain the crossover time data (see FIG. 10). The crossover time data is recovered by circuits 216 and staticized in register 218. Count/compare circuits 220 count from reception time t0 of each frame to reception time $T_{I/X}$ of each frame (the latter time designated digitally by the contents of register 218). Signals corresponding to reception times t0−128, t0+384 and $T_{I/X}$ are passed via lines 224 and double pole double throw switch 226 (or the logical equivalent of such) to the TRP Select lines 186 (FIG. 15) associated with switch 184. In group 1 stations switch 226 is fixed in the upward position illustrated in FIG. 16. In group 2 stations switch 226 is fixed in the down position opposite to the up position shown in FIG. 16. In the up position the signals transferred by switch 226 to TRP SELECT lines 186 (FIG. 15) cause the switch 184 (FIG. 15) to transfer from position A to position B at reception times t0−128 and from position B to position A at reception times $T_{I/X}$, thereby enabling group 1 stations to receive group 1 signals (carried on fr1) after t0 and group 2 signals (carried on fr2) after $T_{I/X}+128$. When fixed in the down position switch 226 passes signals to TRP Select line 186 transferring switch 184 from position B to position A at t0+384 and from position A to position B at $T_{I/X}$, thereby enabling stations in group 2 to receive group 2 signals (carried on fr2) after t0+512 and group 1 signals (carried on fr1) after $T_{I/X}+128$. Since t0+384 occurs after arrival of the useful information of the FRB the stations in group 2 will also receive the FRB sent by the reference station of group 1. Since the FRB occupies the time between t0 and t0+512 the "pad" space of 128 bits between t0+384 and t0+512 allows time to complete the switchover transition. A similar transition time for switchover should be allowed relative to $T_{I/X}$. Consequently the signal associated with $T_{I/X}$ on lines 186 (FIG. 15) should precede the arrival time of useful information in the CROSS GROUP intervals (T12 and T21) by at least 128 bits.

TRAFFIC BURST RECEPTION

Figure 18:
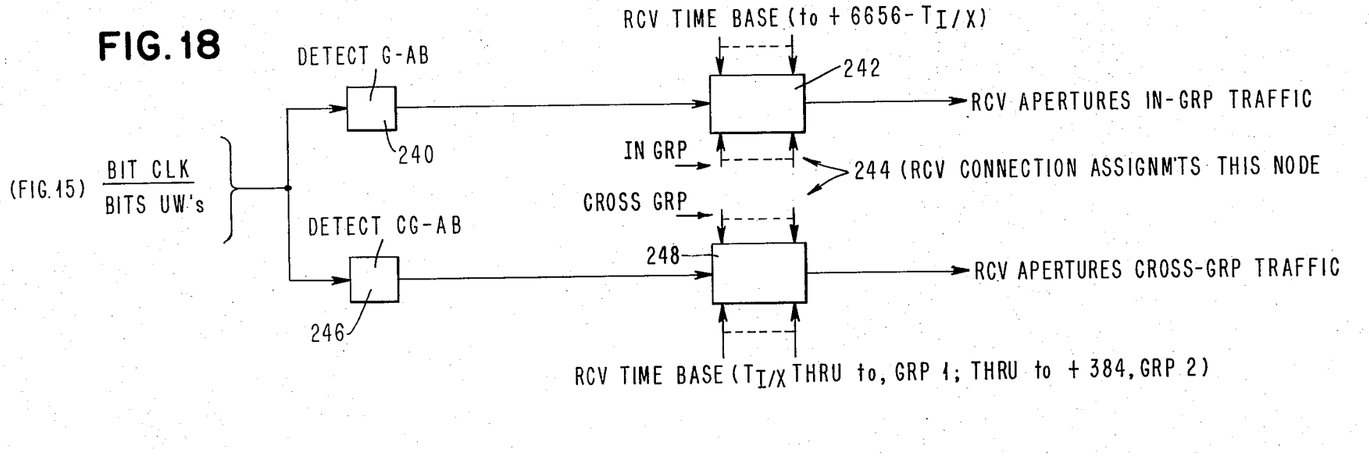

Traffic burst reception is illustrated in FIG. 18. Circuits 240 operate to recover the IN GROUP assignment data 136 (FIG. 11) in the received group assignment bursts G-AB. Circuits 240 may be integrated in the common control system 60 (FIG. 4). The assignment data recovered by the circuits 240 is applied to timing circuits 242 which generate reception apertures relative to the IN GROUP portions of the composite incoming traffic bit stream (i.e., in T11 or T22).

The IN GROUP traffic reception time period spans the time space between t0+6656 (beginning thirteen channels after t0; see FIG. 9) and $T_{I/X}$. Signals defining this time period are received from the receive time base circuits 208 (FIG. 16) IN GROUP connection data of the respective station is presented at 244. Such data is maintained as previously indicated by the common control system 60 of the associated station. This connection data, in combination with the IN GROUP assignment data, is sufficient to establish the channel portions of the incoming traffic bit stream which are scheduled for utilization at the respective station. The IN GROUP traffic stream is processed selectively through circuits gated by pulse outputs of circuits 242. If the traffice stream contains station control information in "unapertured" slots such control information may be recovered by circuits (not shown) sensitive to the control informaton signals. The specific form and mode of recovery of such control information is not considered relevant to the present invention, and will not be considered further in this description.

The CROSS GROUP traffic bit stream is treated similarly. Processing circuits 246 which may be integral to the common control system 60 (FIG. 4) detect and recover the CROSS GROUP assignment data contained in the CROSS GROUP assignment bursts CG-AB. Such data is applied to aperture generating circuits 248 which are enabled during the CROSS GROUP interval which extends from $T_{I/X}$ to t0 of the next frame. Circuits 248 produced timed reception aperture signals for recovery of specific traffic slot/channel portions of the CROSS GROUP bit stream. These aperture signals are applied to not-shown gate circuits which operate to select out of the CROSS GROUP bit stream the relevant traffic information. As indicated previously if the incoming stream contains relevant station control information in unapertured slots/channels respective station circuits should be adapted to recover such control information separately.

BURST TRANSMISSION

Burst transmission involves a process of synchronization acquisition which is presently well understood in the art of TDMA communication. In the present system synchronization acquisition is acquired in three phases: reception acquistion, IN GROUP transmission acquisition and CROSS GROUP transmission acquisition.

At system start-up time the primary reference station in group 1 begins to cyclically transmit FRB's on ftl keyed to an internal frame clock. While doing so the primary reference station reception circuits monitor the signals returning on FR1 for FRB's. When FRB signals are detected the timing of the receive apertures is adjusted to correct for doppler effects until the incoming FRB's are appropriately "centered" in time.

The propagation delay of FRB's, from transmission to reception, is monitored by not-shown common control circuits of the primary reference station and used to calculate a delay deviation factor relative to the nominal propagation delay for that station for the particular time of day. The primary reference station includes the delay deviation factor and time of day information in its outgoing FRB's. It also includes crossover time data associated with $t_{I/X}$ in its FRB's. Initially the crossover time may be set arbitrarily (e.g., at the midpoint of the frame).

Figure 17:
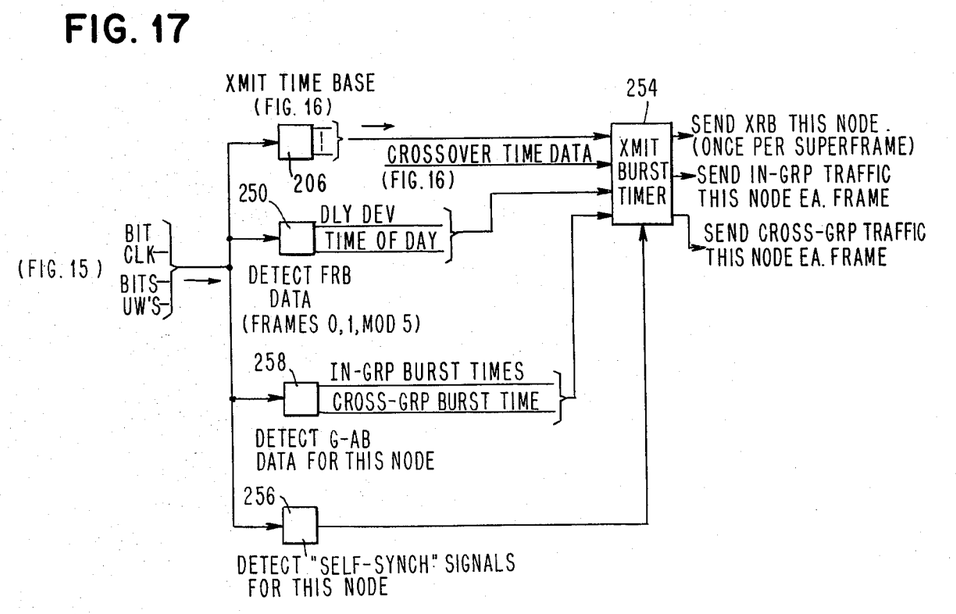
FIG. 17 illustrates station equipment for producing timing apertures for burst transmission in accordance with the invention.

Stations other than the primary reference station may acquire reception synchronism by recovering the primary reference FRB information in circuits 250 (FIG. 17) and register 218 (FIG. 16). The switch 184 (FIG. 15) may be positioned initially to pass only signals carried on frl, until the FRB's being sent by the primary reference station are being detected repeatedly in successive frame periods in a stable mode. Thereafter the switch 184 may be operated in the "normal" alternating mode described previously; transferring to the position for CROSS GROUP reception at $T_{I/X}$ and to the position for intra-group reception at the associated group time (t0−128 in group 1 stations and t0+384 in group 2 stations).

Using the delay deviation, time of day and crossover time information in the FRB a station seeking to acquire synchronization for burst transmission operates its transmission timing circuits 254 (FIG. 17) to send "self-synchronizing" signals in a predetermined IN GROUP slot assigned to that station. Initially such self-synchronizing signals are sent in a traffic slot assigned to the station. After transmit synchronization has been achieved these signals are sent in the XRB slot assigned to the station.

Not all stations in each group need be equipped for inter-group communication. Stations not so equipped will receive only the associated group frequency (frl in group 1 and fr2 in group 2) and acquire synchronism by detecting FRB signals passed through the associated group transponder. Group 2 stations operating in this manner will receive secondary FRB signals sent by the secondary reference station in a manner detailed below.

Receiving its own self-synchronizing signals in circuits 256 (FIG. 17) a station seeking to acquire transmission synchronism for mixed communication (intra-group and inter-group) adjusts the transmission timing of its self-synchronizing signals to the leading edge of its assigned slot. The "self-synchronizing" signal is timed initially to occupy a central position in the assigned slot (to avoid interference with other slots) and thereafter adjusted incrementally in timing (in "small" increments) until it is consistently positioned at the leading edge of the same slot (over multiple frames); whereupon the station may begin to utilize the XRB slot for transmission of the self-synchronizing signals, demand data, etc.

The primary reference station of group 1 utilizes the XRB's of stations in its group to determine status and connection requirements of said group. The primary reference station sends data in its G-AB1 bursts (FIG. 11) Assigning IN GROUP traffic slots to each synchronized station in group 1. This data is received in circuits 258 (FIG. 17) and utilized to control circuits 254 for transmission of group 1 traffic information.

The secondary reference station of group 2 begins its acquistion of reception synchronization detecting the primary FRB signals. When reception synchronization is achieved the secondary reference station may begin its aquisition of transmission synchronization using the delay deviation and time of day information forwarded by the primary reference station and its assigned slots on ft2, fr2. It also acquires crossover synchronization by monitoring the crossover time information in the primary FRB's. The other stations in group 2 may acquire reception synchronism similarly, using the primary FRB data, and thereafter acquire transmission synchronism; initially using assigned portions of the traffic space on the associated transponder as described previously to circulate self-synchronizing signals, and thereafter maintaining synchronism by using respective XRB slots to circulate self-synchronizing signals.

Stations in both groups may acquire CROSS GROUP synchronization by monitoring the crossover time information in the primary reference FRB and switching respective switches 184 (FIG. 15) at appropriate time points as described previously The stations may then use CROSS GROUP assignments (in G-AB1 and CG-AB2 for group 1 stations and G-AB2 and CG-AB1 for group 2 stations) to carry on inter-group communications.

For stations not equipped for CROSS GROUP operation the above synchronization system may be modified as follows. Note (FIG. 10) that the primary reference FRB occupies the interval between t0 and t0+512 but is carried only on ftl, frl. Hence there is effectively a vacancy in time on ft2, fr2 between the same time points t0 and t0+512. This "vacant" slot may be used by the secondary reference station to transmit secondary FRB's (frame reference bursts) which are identical to previously received FRB's sent by the primary station (i.e., primary FRB's). Stations in group 2 equipped to receive only fr2 will thereby receive and use data in the secondary FRB's and assigned XRB slots on ft2, fr2 to acquire transmission synchronization.

As explained previously stations in both groups adapted for inter-group communication will synchronize directly to the primary FRB signals. This is preferred inasmuch as synchronization to the secondary FRB signals in group 2 stations introduces a potential double "jitter" effect relative to the primary reference source. However it is not essential if the sources of primary and secondary FRB's are sufficiently stable. In systems having sufficiently stable FRB sources satisfactory operation may be achieved if all stations in group 2, other than the secondary reference station, synchronize to the secondary FRB signals and the secondary reference station and all stations in group 1 synchronize to the primary FRB's. In such systems the stations in group 2, other than the secondary reference station, would switch to IN GROUP reception mode at t0−128 (i.e., at the same time as group 1 stations) and only the secondary reference station would switch at t0+384.

DEMAND ASSIGNMENT

The present system in its preferred mode of operation utilizes two processes of demand assignment. In one process termed crossover time assignment the primary reference station determines a crossover time associated with $T_{I/X}$ which is communicated in the primary FRB. In another process of assignment the primary and secondary reference stations assign "available" time slots within the IN GROUP and CROSS GROUP periods delimited by $T_{I/X}$ to stations of respective groups. The primary reference station assigns slots to group 1 stations in IN GROUP time T11 and CROSS GROUP time T12, and communicates the assignments on assignment bursts G-AB1. The secondary reference station assigns slots in IN GROUP time T22 and CROSS GROUP time T21 to group 2 stations and communicates the assignments on assignment bursts G-AB2.

Figure 21:
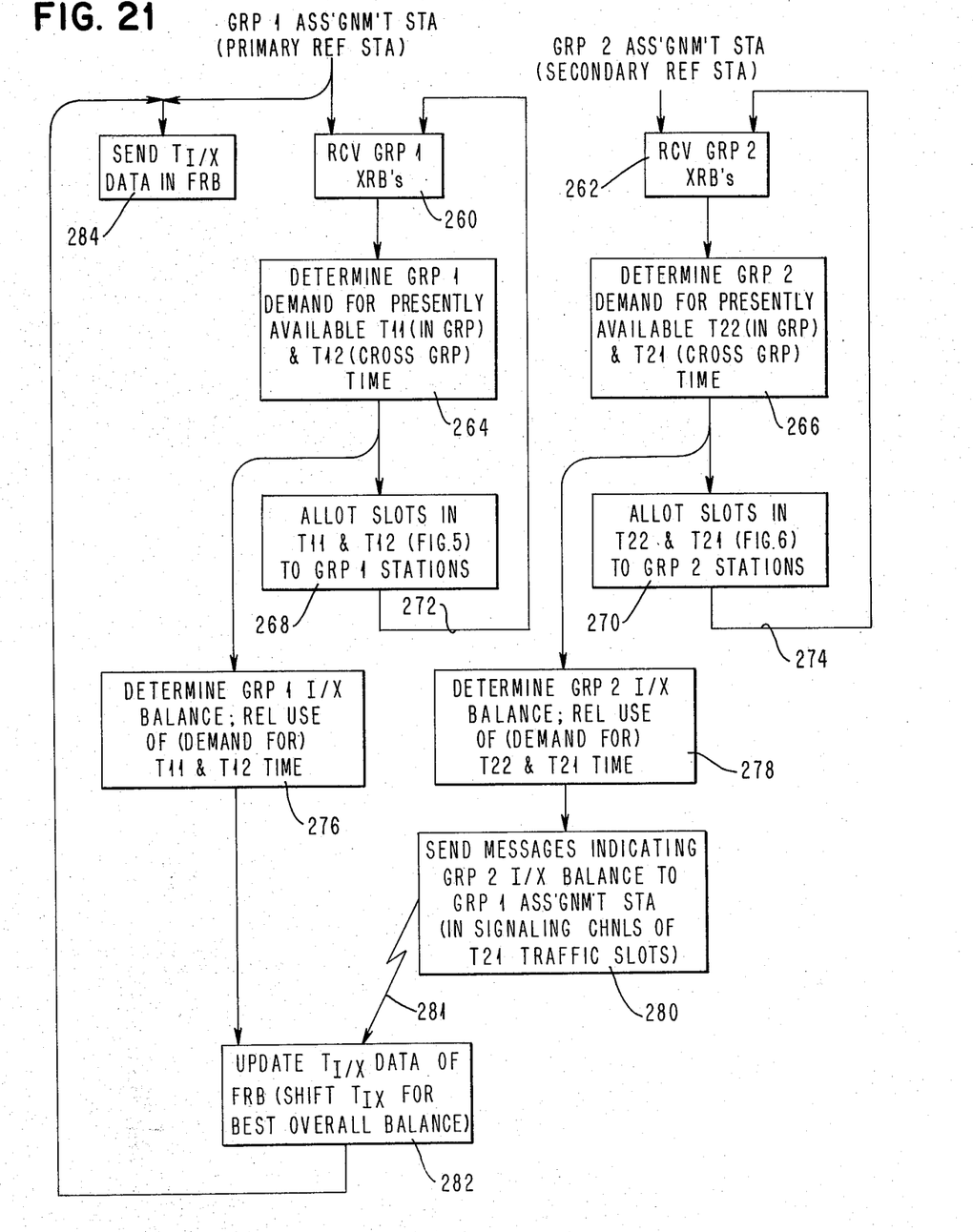
FIG. 21 illustrates the process of crossover time determination conducted by primary and secondary stations.

This procedure is characterized in FIG. 21. The primary and secondary reference stations receive their respective XRB transmissions at 260 and 262, from respective group stations, and extract demand information as suggested at 264 and 266 respectively. The reference stations allot transmission time slots in respective IN GROUP and CROSS GROUP periods (of respective transponder frequencies ft1 and ft2) in accordance with existing demand as suggested at 268 and 270. The assignments are based on conventional algorithms for TDMA/DA operation which are not relevant to the present invention. The objective is to maximize utilization of the available time and avoid under-utilization of time by some stations while other stations have a need for the same time.

This process operates recursively as indicated by return lines at 272 and 274 to respective processes of XRB recovery. Concurrently the primary and secondary reference stations determine the overall utilization of IN GROUP and CROSS GROUP time in the respective groups as shown at 276 and 278. The secondary reference station utilizes signaling channels of the traffic bursts to send messages to the primary station as shown at 280 and suggested by line 281. The group 1 primary station determines the relative utilization of IN GROUP and CROSS GROUP time on the transponders associated with both groups 1 and 2. With this information the primary reference station determines a crossover time suitable for balanced utilization of both transponders. If this time is different from the time currently being communicated in the FRB the FRB data is updated as suggested at 282 and the updated crossover time information is communicated to all stations as suggested at 284. The crossover time is changed only on superframe boundaries. All assignments G-AB by the primary and secondary reference stations are based upon time periods delimited by the current (updated) crossover time.

DESTINATION (PORT) ADDRESSING

In the foregoing traffic signal channels may be directed to the ports 40, 42 (FIG. 4) by means of address information in the signal channels. An interesting aspect of the present system is that such address signals in IN GROUP and CROSS GROUP time slots need not be relatively differentiated since slots are received only by stations in one group.

For the situation in which group 2 stations are adapted only for unitransponder (one-frequency) operation it should be apparent that signals sent to such stations during CROSS GROUP time will originate only at group 2 stations and occupy only slots on fr2 which are not in use relative to group 1 stations. Hence common destination addressing presents no problem of ambiguity.

ADAPTATION FOR MORE THAN TWO GROUPS

The crossover time particularly technique described above extends in an obvious mode to serve three groups of stations using three transponder frequencies (ft1/fr1, ft2/fr2 and ft3/fr3). It is merely necessary to define three crossover times in the primary FRB; for respectively delimiting periods for communication between stations of the first and second groups, second and third group and first and third groups. Obviously the circuits of FIGS. 15–18 would be modified to allow for recovery and utilization of the three crossover time factors.

REFERENCE STATION RECONFIGURATION

Should a primary or secondary reference station become unavailable it will be desirable to be able to establish a new primary or secondary reference station. For this purpose any of the existing stations may be used as a reference station. If time synchronization is not lost the "new" primary or secondary reference station may begin to broadcast the FRB in the FRB slot after the "old" station is "silenced". A new reference station will also transmit a "new" group assignment burst in the appropriate burst assignment slot. A new secondary reference station may as indicated above also transmit a copy of the primary FRB in the initial (FRB) time slot ft2.

ACCOMMODATION OF FUTURE SATELLITE TECHNOLOGIES

The system described above should adapt very simply and economically to future satellite repeater technologies involving the use of more sophisticated "on-board" equipment in the satellite.

Figure 19:
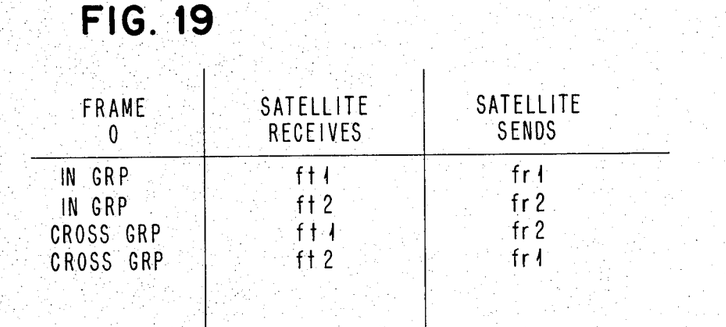
FIGS. 19 and 20 schematically illustrate switching of transponder frequencies in the satellite (on-board) for explaining an evolutionary capability of the subject invention.

FIG. 19 illustrates a hypothetical capability of future satellite repeaters for performing frequency switching on an "intelligent" basis during IN GROUP and CROSS GROUP periods of a basic TDMA frame shared by multiple groups of transceiver nodes. FIG. 19 suggests transposition of carrier frequencies ft1 and ft2 to carrier frequencies fr1 and fr2 respectively during IN GROUP periods, and to fr2 and fr1 respectively during CROSS GROUP periods. Ovbiously this would be the equivalent of the functions presently performed by the multiple earth station receivers using more conventional "active" satellite repeaters.

Figure 20:
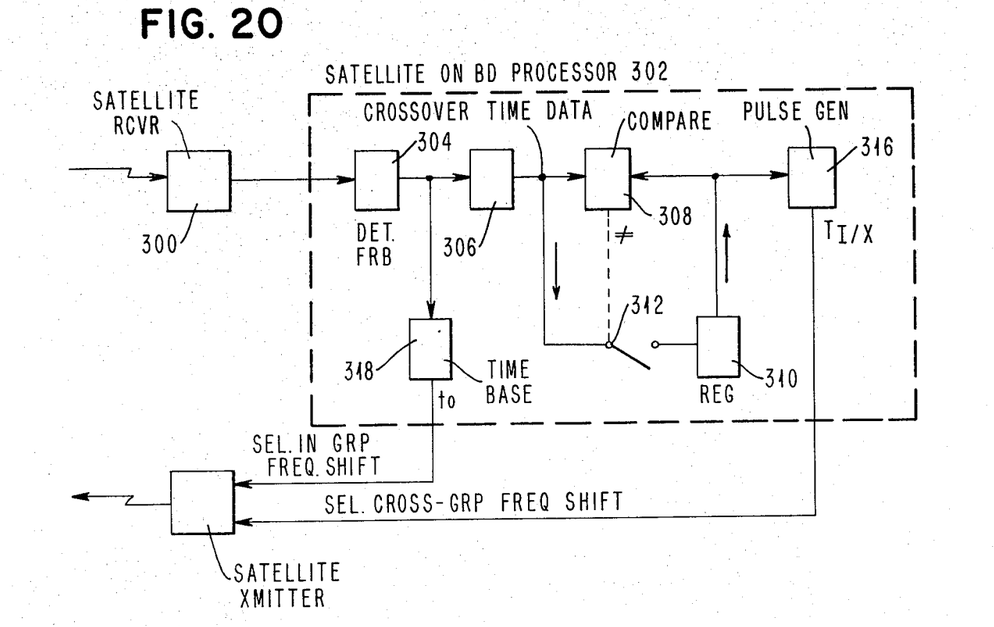

FIG. 20 suggests "on-board" satellite "logic" for shifting the time point of $T_{I/X}$ in accordance with earth station demand. Satellite receiver 300 passes information received by the satellite on ft1 and ft2 to on-board processor 302. Facilities 304 in said processor recover the FRB and facilities 306 recover and staticize the crossover time data contained in the FRB. This data is compared in compare circuit 308 to earlier crossover time data in register 310. When inequality exists switch 312 is operated to replace the contents of register 310 with the new crossover time data provided by facilities 306. The data in register 310 is applied to generator circuit 316 to produce time signals which represent the transition point $T_{I/X}$ from IN GROUP and CROSS GROUP reception periods "on-board" the satellite. Time base circuits 318 coupled to FRB detector 304 provide signals corresponding to the inital frame time t0 relative to on-board reception at the satellite. The signals produced by circuits 316 and 318 are applied to the satellite transmission equipment to determine the transition points n time for switching between IN GROUP and CROSS GROUP displacements of the "repeated" frequency.

It should be apparent that only minor modifications of ground station transceiver equipment would be required to adapt to such on-board frequency shifting capability. The receiver switches such as 184 (FIG. 15) should be fixed in positions such that the respective station receives only the transponder frequency fr1 or fr2 associated with its own station group during both IN GROUP and CROSS GROUP intervals. Quite apparently future stations not equipped with switches 184 would be inherently adaptive to CROSS GROUP operation in such a system.

While the invention has been particularly shown and described with reference to preferred embodiments thereof, those skilled in the art will recognize that the above and other changes in form and details may be made therein without departing from the spirit and scope of the invention.

What is claimed is:

1. A method for synchronization in intertransponder communication TDMA networks, comprising:

partitioning TDMA burst frame periods into IN GROUP and CROSS GROUP sub-periods to be used respectively by plural groups of stations assigned to different transponders for intra-group and inter-group communications in TDMA mode;

at individual radio transceiving nodes, in plural groups of nodes associated with said groups of stations, transmitting bursts of information signals in TDMA slots in each of said sub-periods; signal bursts transmitted from any node in either sub-period being carried as modulation only on one outgoing radio carrier frequency associated with the respective group; each group having a different associated outgoing carrier frequency, each node having no more than one radio transmitter;

relaying signal bursts from each group of nodes through an associated transponder segment of a satellite repeater on an associated incoming carrier frequency; each group having a different associated transponder segment having a unique pair of outgoing and incoming carrier frequencies;

at individual nodes of each group, selectively receiving signals relayed by said repeater; each node receiving the incoming frequency associated with the respective group during IN GROUP sub-periods and the incoming carrier frequencies associated with other groups during the CROSS GROUP sub-periods; nodes in one of said groups thereby being capable of exchanging signals with each other by means of bursts communicated in the IN GROUP sub-periods and with nodes in other groups by means of bursts communicated in the CROSS GROUP sub-periods;

transmitting frame reference information signals from a predetermined one of said nodes through said repeater to all of said nodes; said reference signals designating a variable crossover time representing a partition boundary in each frame period between the IN GROUP and CROSS GROUP sub-periods of that period;

detecting said frame reference signals at all of said nodes; and keying transmissions from said nodes in both sub-periods of each period to times of detection of said frame reference signals and crossover times designated in said reference signals;

transmitting said frame reference signals from a predetermined reference node in one of said groups in a time slot contiguous in time to both the IN GROUP and CROSS GROUP sub-periods;

receiving said frame reference signals at nodes in said one of said groups as an integral part of signals representing IN GROUP transmissions relative to said one group; and receiving said frame reference signals at nodes in groups other than said one group as an integral part of the signals representing CROSS GROUP transmissions relative to said other groups.

2. A method for acquisition of synchronization in intertransponder communication TDMA networks, comprising:

partitioning TDMA burst frame periods into IN GROUP and CROSS GROUP sub-periods to be used respectively by plural groups of stations assigned to different transponders for intra-group and inter-group communications in TDMA mode;

at individual radio transceiving nodes, in plural groups of nodes associated with said groups of stations, transmitting bursts of information signals in TDMA slots in each of said sub-periods; signal bursts transmitted from any node in either sub-period being carried as modulation only on one outgoing radio carrier frequency associated with the respective group; each group having a different associated outgoing carrier frequency, each node having no more than one radio transmitter;

relaying signal bursts from each group of nodes through an associated transponder segment of a satellite repeater on an associated incoming carrier frequency; each group having a different associated transponder segment having a unique pair of outgoing and incoming carrier frequencies;

at individual nodes of each group, selectively receiving signals relayed by said repeater; each node receiving the incoming frequency associated with the respective group during IN GROUP sub-periods and the incoming carrier frequencies associated with other groups during the CROSS GROUP sub-periods; nodes in one of said groups thereby being capable of exchanging signals with each other by means of bursts communicated in the IN GROUP sub-periods and with nodes in other groups by means of bursts communicated in the CROSS GROUP sub-periods;

transmitting frame reference information signals from a predetermined one of said nodes through said repeater to all of said nodes; said reference signals designating a variable crossover time representing a partition boundary in each frame period between the IN GROUP and CROSS GROUP sub-periods of that period;

detecting said frame reference signals at all of said nodes;

keying transmissions from said nodes in both sub-periods of each period to times of detection of said frame reference signals and crossover times designated in said reference signals;

transmitting from each node a respective transmit reference burst signal in a respective preassigned XRB time slot in said IN GROUP sub-periods;

detecting the respective XRB signals relayed by said satellite repeater, in association with said frame reference signals, at the respective node;

locking transmissions of the respective XRB signals from the respective node in fixed time relation to the detection of said frame reference signals; and locking transmissions of signals other than the XRB signals from the respective node, in both of said sub-periods in a fixed time relation to the transmissions of the respective XRB signals.

* * * * *